(12) United States Patent
Qiu et al.

(10) Patent No.: US 11,734,909 B2
(45) Date of Patent: Aug. 22, 2023

(54) MACHINE LEARNING

(71) Applicant: Ford Global Technologies, LLC, Dearborn, MI (US)

(72) Inventors: Shiqi Qiu, Canton, MI (US); Kalyani Purushottam Sonawane, Plymouth, MI (US); Fling Finn Tseng, Ann Arbor, MI (US); Johannes Geir Kristinsson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 17/307,162

(22) Filed: May 4, 2021

(65) Prior Publication Data

US 2022/0358315 A1    Nov. 10, 2022

(51) Int. Cl.
| | | |
|---|---|---|
| *G06V 10/25* | (2022.01) | |
| *H04N 7/18* | (2006.01) | |
| *B60R 1/00* | (2022.01) | |
| *G06N 20/00* | (2019.01) | |
| *G06N 5/04* | (2023.01) | |
| *G06V 20/56* | (2022.01) | |

(52) U.S. Cl.
CPC ............... *G06V 10/25* (2022.01); *B60R 1/00* (2013.01); *G06N 5/04* (2013.01); *G06N 20/00* (2019.01); *G06V 20/56* (2022.01); *H04N 7/183* (2013.01)

(58) Field of Classification Search
CPC .......... G06V 20/56; G06V 10/25; B60R 1/00; G06N 5/04; G06N 20/00; G06N 3/0464; G06N 3/084; H04N 7/183; H04N 7/188; G06F 18/214; G06F 18/2178

USPC ......................................................... 348/148
See application file for complete search history.

(56) References Cited

U.S. PATENT DOCUMENTS

| | | | |
|---|---|---|---|
| 9,517,415 B2 | 12/2016 | Muench et al. | |
| 10,037,471 B2 | 7/2018 | Satzoda et al. | |
| 10,717,445 B2 | 7/2020 | Michalakis et al. | |
| 2018/0114099 A1* | 4/2018 | Desai | G06K 9/6263 |
| 2018/0307916 A1* | 10/2018 | Satzoda | G06K 9/6223 |
| 2019/0228262 A1 | 7/2019 | Gonzalez et al. | |
| 2019/0241122 A1 | 8/2019 | Cohen | |
| 2019/0258878 A1* | 8/2019 | Koivisto | G06V 10/762 |
| 2019/0389482 A1* | 12/2019 | Michalakis | G05D 1/0055 |
| 2020/0391736 A1* | 12/2020 | Smith | G06N 20/00 |
| 2020/0410224 A1* | 12/2020 | Goel | G06V 40/10 |
| 2021/0241035 A1* | 8/2021 | Sutherland | G06K 9/6253 |

(Continued)

OTHER PUBLICATIONS

"ReCAPTCHA: Using Captchas To Digitize Books," Tech Crunch, Apr. 8, 2021, 6 pages.

*Primary Examiner* — Christopher S Kelley
*Assistant Examiner* — Ana Picon-Feliciano
(74) *Attorney, Agent, or Firm* — Brandon Hicks; Bejin Bieneman PLC

(57) ABSTRACT

A system comprises an image sensor with a field of view of an exterior of a vehicle; a human machine interface (HMI) in the vehicle arranged to display images based on data from the image sensor; and a first computer that includes a processor and a memory. The first computer is programmed to provide data from the image sensor to a machine learning program that outputs a bounding box around an object; cause the bounding box around the object to be displayed via the HMI; and transmit object data including an inputted label identifying the object to a second computer that is remote from the vehicle.

17 Claims, 6 Drawing Sheets

(56) References Cited

U.S. PATENT DOCUMENTS

2021/0302187 A1* 9/2021 Nagavalli .......... G01C 21/3407
2021/0383209 A1* 12/2021 Brahma ................... G06N 3/08

* cited by examiner

MACHINE LEARNING

BACKGROUND

Data from image sensors such as optical cameras and lidar can be used by a computer executing a trained machine learning program to detect and identify objects. Object data can be used in various machines, such as vehicles, manufacturing robots, warehouse robots, etc. For example, data from image sensors in a vehicle can be provided to a vehicle computer that can detect and/or identify objects based on a machine learning program, whereby the computer is aided in controlling and/or assisting vehicle operations. Training a machine learning program to detect and identify objects typically requires a large corpus of training data, and can require large amounts of computer processing cycles and time.

DETAILED DESCRIPTION

Figure 1:
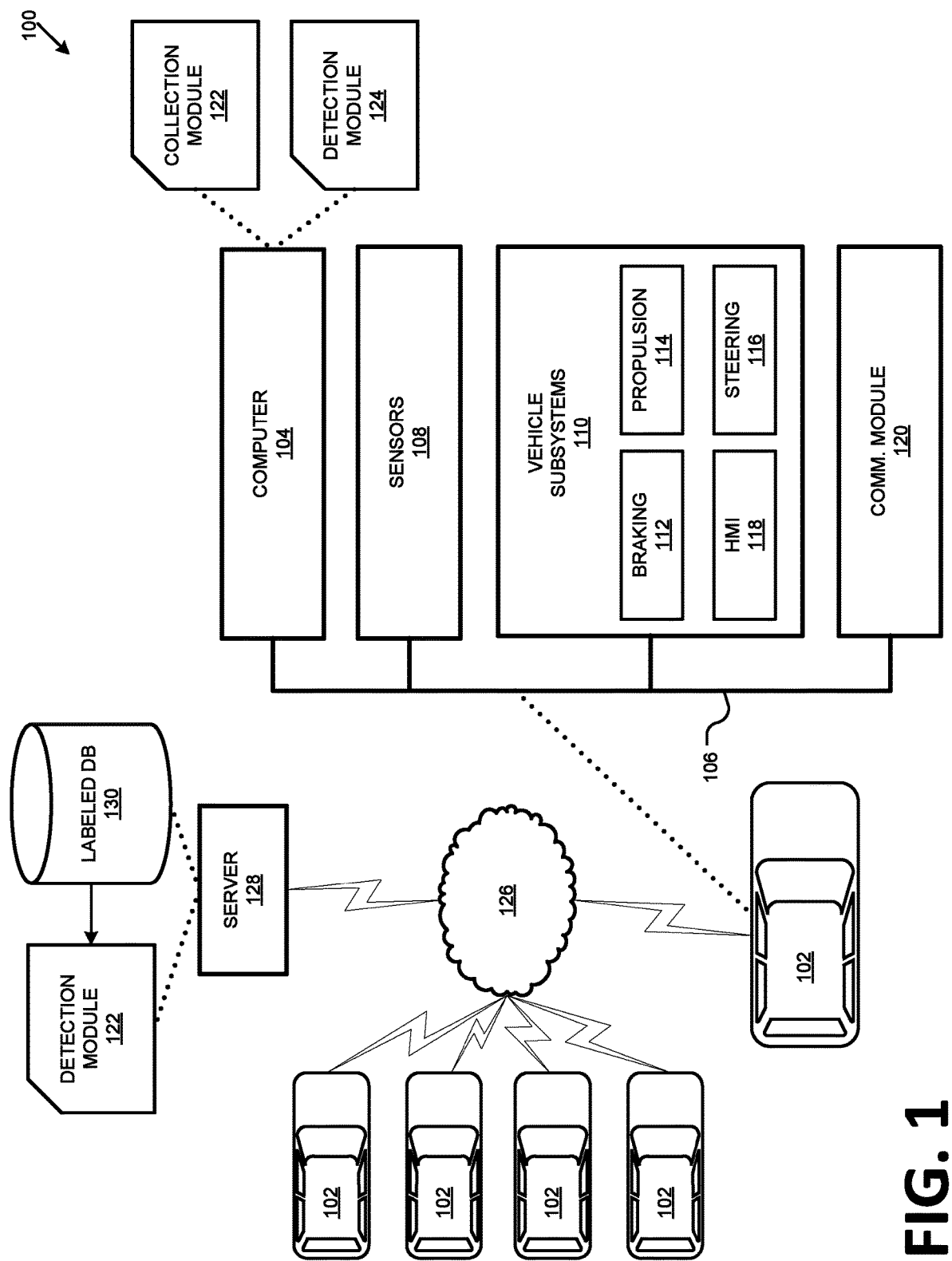
FIG. 1 is a block diagram of an example object detection system.

Training a machine learning program for object detection and/or identification relies on a very large number of correctly labeled images, i.e., image data accompanied by labels or tags specifying an object represented in the image data. Advantageously, as disclosed herein, it is possible to obtain large sets of labeled image data, and moreover, to perform processing such as cross-validation of received sets of labeled image data to thereby provide a reliable set of labeled image data for training a DNN. As explained further below, a computer in a movable object detection platform such as a vehicle can detect objects that can then be presented to a user via a display in a vehicle human machine interface (HMI). The user can provide a label for the displayed object via input to the HMI. User-provided labels and associated image data can then be provided to a central server for training a machine learning program such as a deep neural network (DNN). The DNN can then be deployed, e.g., to vehicles, to provide object detection that can be provided as a basis for operating a machine such as a vehicle.

A system comprises an image sensor with a field of view of an exterior of a vehicle; a human machine interface (HMI) in the vehicle arranged to display images based on data from the image sensor; and a first computer that includes a processor and a memory. The first computer is programmed to provide data from the image sensor to a machine learning program that outputs a bounding box around an object; cause the bounding box around the object to be displayed via the HMI; and transmit object data including an inputted label identifying the object to a second computer that is remote from the vehicle.

The machine learning program can further output one or more candidate labels for the object, and the first computer can be programmed to receive input specifying a user selection of one of the one or more candidate labels.

The object can be a first object in a plurality of objects and the bounding box is a first bounding box in a plurality of bounding boxes. The machine learning program can further output the plurality of bounding boxes, including the first bounding box and at least one second bounding box. Each of the bounding boxes can then be provided around a respective object in the plurality of objects that includes the first object and at least one second object.

The object data can further include data about an environment around the vehicle associated with a time at which the inputted label was input.

The data from the image sensor can include a plurality of frames of video including the object and captured over a time interval while the vehicle is moving. The inputted label can be a first inputted label and associated with a first time in the time interval and the object data can include one or more second inputted labels respectively associated with one or more second times in the time interval.

The vehicle can be a first vehicle in a plurality of vehicles and the object data can be a first set of object data in a plurality of sets of object data, whereby the inputted label is one of a plurality of inputted labels in the respective sets of object data. The system can further comprising the second computer, wherein the second computer includes a second processor and a second memory and is programmed to receive the plurality of sets of object data from respective vehicles in the plurality of vehicles. The second computer can be further programmed to perform a cross-validation to verify or reject labels in one of more of the sets of object data. The second computer can be further programmed to remove rejected labels from the object data. The second computer can be further programmed to provide an updated data collection program by adjusting a rule for requesting user input based on a result of the cross-validation; and provide the updated data collection program to the vehicle. The second computer can be further programmed to classify a user associated with one of the sets of object data based on the result of the cross-validation; wherein the rule specifies whether the user is permitted to provide the inputted data, and adjusting the rule includes determining that the user is not permitted to provide the inputted data. The second computer can be further programmed to determine a type of one of the objects in the sets of object data, wherein the rule specifies a frequency with which a user providing the inputted label for the one of the objects is requested to provide input when a candidate label specifies the type, and adjusting the rule includes adjusting the machine learning program to present objects of the type to a user providing the inputted label more or less frequently based on a result of the cross-validation. The second computer can be further programmed to compare the respective inputted labels to map data to perform verification of one of the inputted labels or the map data.

The machine learning program can be a first machine learning program, and the second computer can be further programmed to generate a second machine learning program based on the plurality of sets of object data to perform object identification. The second computer can be further programmed to provide the second machine learning program to one or more vehicles in the plurality of vehicles or another vehicle. The first computer can be further programmed to receive the second machine learning program, and operate the vehicle according to object identification output from the second machine learning program.

Referring to FIG. 1, an object detection system 100 can include a plurality of object detection platforms, i.e., mobile machines including elements such as discussed herein whereby the platform can obtain image data at a plurality of locations. Example object detection platforms illustrated and discussed herein are conventional ground vehicles 102. As seen in FIG. 1, a vehicle 102 can include a variety of elements, including a vehicle 102 computer 104 arranged to communicate via a vehicle network 106 with other vehicle 102 components, including sensor, various vehicle subsystems 110, and a communication module 120. Further, FIG. 1 illustrates a plurality of vehicles 102 that can include various of the elements described herein, although FIG. 1 details the various elements with respect to only one of the depicted vehicles 102 for ease of illustration.

The vehicle 102 typically includes a plurality of computing devices, including a vehicle 102 computer 104 provided to carry out object detection operations. The vehicle 102 computer 104 can include various program modules i.e., computer programs that are sets of program instructions for carrying out specified operations or algorithms such as described below. For example, to support object detection operations, the computer 104 can include a data collection module 122 and/or an object detection module 124.

The data collection module 122 can include a first machine learning program trained to identify candidate objects 132 and possibly also candidate labels 136 that can be presented to a user, e.g., in a vehicle 102 HMI 118, as described further below. Object data collected in the data collection module 122 can be provided to a remote server 128 to train a second machine learning program that can be included in an object detection module 124 that can be deployed to one or more vehicles 102 to perform object identification. As illustrated in FIG. 1, a vehicle 102 102 includes both a collection module 122 and a detection module 124, although in actual implementation, a vehicle 102 could include a collection module 122 without a detection module 124 or a detection module 124 without a collection module 122. Once trained, the detection module 124 can be provided, e.g., downloaded from the remote server 128, to one or more vehicles 102. A vehicle 102 computer 104 can receive the object detection module 124 including the second machine learning program, and can then operate the vehicle 102 according to object identification output from the second machine learning program.

The data collection module 122 can include program instructions to receive image data via the vehicle network 106 from one or more image sensors 108 in the vehicle 102, and to cause the HMI 118 to display the images. The computer 104 can further include program instructions to provide data from the image sensor to a machine learning program included in the data collection module 122 that detects an object and outputs a bounding box 134 for the object that can be displayed around the object. For example, the computer 104 can further be programmed to then cause the bounding box 134 around the object to be displayed via the HMI 118. Via the HMI 118, the computer 104 can receive user input to label the object (i.e., the computer 104 can receive an inputted label). The machine learning program in the data collection module 122 can be a DNN 138 such as described further below.

The detection module 124 can include a second machine learning program trained to identify (or classify) objects to support operation of a vehicle 102. For example, the second machine learning program can include a DNN 138, such as described below, trained to accept image data as input (i.e., inputted image data), and to output an object classification or identification. The second machine learning program in the detection module 124 is not necessarily, but may be, trained at least in part with data provided from collection modules 122 in respective vehicles 102.

Image sensors 108 to provide image data to be input to the data collection module 122 and/or the detection module 124 are included in or on the vehicle 102 and have a field of view of an exterior of a vehicle 102. based on image data from one or more image sensors provided to the computer via the vehicle network, the collection module can identify candidate objects 132. A candidate object is defined by a set of pixels in an image, where the set of pixels is identified by the machine learning program included in the collection module 122 as belonging to an object.

The HMI 118 can include one or more of a display, a touchscreen display, a microphone, a speaker, etc. Alternatively or additionally, a display of the HMI 118 could include an augmented reality (AR) display, e.g., to display images and data, including as described herein, in a vehicle 102, e.g., the HMI could include a heads up display (HUD) or the like to display content on a vehicle 102 window or front windscreen (windshield), etc. The user can provide input to devices such as the computer 104 via the HMI 118. The HMI 118 can communicate with the computer 104 via the vehicle network 106, e.g., the HMI 118 can send a message including the user input provided via a touchscreen, microphone, a camera that captures a gesture, etc., to a computer 104, and/or can display output, e.g., via a screen, speaker, etc.

Thus, an HMI 118 provided in a vehicle 102 can be arranged to display images based on data from the image sensor, including candidate objects 132. Further, in some implementations, the computer 104 causes the HMI 118 to display candidate labels 136 for a candidate object 132. The machine learning program can output the candidate labels 136 in addition to the determining the object and the bounding box 134 for the object in image data. The computer 104 can be programmed to receive input specifying a user selection of one of the one or more candidate labels 136, either in response to a list provided via the HMI 118 and/or by a user, e.g., via voice input (e.g., "car" or "tree"), in response to an image including a bounding box 134. In some implementations, the machine learning program may not output and/or the HMI 118 may not display candidate labels 136. Further, whether the HMI 118 does or does not display candidate labels 136, the computer 104 can be further programmed to receive user input via the HMI 118 of the candidate labels 136, e.g., voice input.

In some implementations, the machine learning program can detect a plurality of objects (i.e., two or more) in an image, and can provide respective bounding boxes 134 for each of the detected objects. The user can then select one of the objects for labeling, and can then provide a candidate label 136 as described above. For example, the two candidate objects 132 shown respectively in FIGS. 2 and 3 could in such example be presented to a user together on a display. The user could select one of the objects, e.g., by input to a touchscreen or voice input (e.g., "label left" or "label right"), and can then provide a candidate label 136 as just described.

The collection module 122 in the vehicle 102 computer 104 further typically includes programming to transmit object data, i.e., images including objects and associated inputted candidate labels 136, to a second computer 104, i.e., via a wide area network 126 to a remote server 128. Alternatively or additionally, object data could be obtained from the vehicle 102 computer 104 via other suitable mechanisms, e.g., the access through a data port provided on the vehicle 102, such as a USB (Universal Serial Bus) port.

In one implementation, in addition to image data and inputted candidate labels 136, object data can further include environment data associated with a time at which the inputted candidate label 136 was input; environment data is data providing measurements of phenomena outside a vehicle 102, i.e., in an environment around the vehicle 102. Thus, vehicle environment data can include road data, weather data, traffic density data, and the like. Further, environment data is typically collected by vehicle 102 sensors 108, but alternatively or additionally could be provided from a source outside the vehicle 102, e.g., a remote source such as a server 128, based on a time or times that the vehicle 102 is at or traveling through a specified location.

The image sensor can include a plurality of frames of video including the object and captured over a time interval while the vehicle 102 is moving. In such an example, an image of an object presented to a user via the vehicle 102 HMI 118 may be a still image, e.g., one of the frames. However, the object data provided to the remote server 128 can include the plurality of frames, e.g., frames for a period of time such as five seconds, 10 seconds, etc., along with the inputted candidate label 136. Providing a plurality of frames collected during a time interval and including an object associated with an inputted candidate label 136 advantageously provides a richer label data set for training a machine learning program for object recognition then could be provided from single frames, i.e., frames including an object at a single point in time.

An inputted candidate label 136 can be a first inputted candidate label 136 associated with a first time in the time interval; the object data can then include one or more second inputted candidate labels 136 respectively associated with one or more second times in the time interval. That is, inputted candidate labels 136 can be associated with different time intervals. For example, an image of an object can be displayed via the HMI 118 after a first time interval, and a user inputted candidate label 136 can be obtained. Then an image of the object can be displayed via the HMI 118 after a second time interval, and a second user inputted candidate label 136 for the object can be obtained. Respective sets of object data, i.e., for each of the first and second time intervals, can then be provided to the remote server 128, and stored in an object database 130 in or accessible by the server 128.

As stated above, the object detection system 100 typically includes a plurality of vehicles 102. Object detection data provided to the remote server 128 from a first vehicle 102 can for convenience thus be referred to as a first set of object data in a plurality of sets of object data. An inputted candidate label 136 included in a first set of object data is one of a plurality of inputted candidate labels 136 in sets of object data from respective vehicles 102 in the plurality of vehicles 102. Thus, the central server 128 can be programmed to receive the plurality of sets of object data from respective vehicles 102 in the plurality of vehicles 102.

The server 128 can be programmed to perform a cross-validation according to any suitable cross-validation technique to verify or reject labels in one of more of the sets of object data. One advantage of receiving data from a plurality of vehicles 102 and/or from a plurality of users is that cross-validation can be used to evaluate inputs from respective vehicles 102 and/or users. For example, object data could be collected from a plurality of vehicles 102, and determined to relate to a same object, i.e., based on times of collection of respective object data being within a predetermined interval, and the object data being collected at respective locations within a predetermined threshold (e.g., five meters or 10 meters) of each other. Cross-validation techniques could then be used to evaluate training of a machine learning program using the object data. Further, cross-validation techniques could be used to hold out data provided by a specific source, e.g., a vehicle 102 and/or user, and then to compare an inputted candidate label 136 in the held out object data to a result of training the machine learning program. Then, if the comparison indicates that a set of object data includes a rejected label, e.g., that a source includes an incorrect labeled for an object based on results of training the machine learning program from other object data, the server 128 can then reject a label deemed incorrect. Rejected labels can be removed from object data then used to train the machine learning program.

Further, the server 128 can generate a classification for a source of object data, e.g., a user and/or a vehicle 102, based on accepting or rejecting labels in object data from an object data source. The classification could be according to a score or rating for the object data source. For example, if object data from a source includes a label determined to be one of correct or incorrect, e.g. based on cross-validation, then the server 128 can be programmed to update a classification, e.g., a rating, for that source. A rating in this context is a numeric value that can be used to assign a weight to be given to an inputted candidate label 136 in object data from a source. The rating can indicate a confidence that a label from the source will be accurate, i.e., match ground truth. For example, a source could initially be assigned a default or normal value, e.g., 0.8 or 80%. The server 128 could then be programmed to adjust the default rating up or down when an incorrect or correct label is deemed to have been provided. Further, the server 128 could be programmed to adjust a default rating up or down after an aggregate number of incorrect or correct labels are deemed to have been provided from a source. An aggregate number of correct or incorrect labels may have to exceed a threshold number, e.g., 10 labels, 100 labels, etc., and could be determined by assigning a positive value to correct labels and a negative value to incorrect labels, and then determining the aggregate number as a sum of the values assigned to correct and incorrect labels.

A user's rating could be used to provide the user with a reward, e.g., a user device could be provided with tokens or the like to make purchases, obtain discounts, etc. A rating could also be used to provide a user with encouragement to improve to obtain a reward. Further, the server 128 computer 104 could provide an updated data collection module 122 to a vehicle 102 by adjusting a rule for requesting user input based on a result of the cross-validation, e.g., based on adjusting a rating for an object data source, e.g., a vehicle 102 or a user of the vehicle 102. For example, a classification for an object data source based on a rating could specify that the user is or is not permitted to provide inputted candidate labels 136. An updated rule in a data collection module 122 could specify that a user previously permitted to provide inputted candidate labels 136 is no longer permitted to provide inputted candidate labels 136 and/or that candidate labels 136 inputted by that user are to be ignored, e.g., not provided in object data from a vehicle 102 to the remote server 128.

Further, a classification of an object data source such as a user can include a rating of the source for a specific type of object. A type of object means a classification of the object that can be output by a machine learning program, e.g., vehicles 102, rocks, road signs, pedestrians, bicycles, fences, etc., are types of objects. The server 128 computer can be programmed to determine a type of one of the objects in the sets of object data, e.g., according to a machine learning program. based on an identified type of an object from a machine learning program and cross validation of the identification of the type of object in a set of object data from a source, a rule in a data collection module 122 can be updated to specify a frequency (e.g., on a scale of zero to one, where zero is "never" and one is "always") with which a user providing the inputted candidate label 136 for the one of the objects is requested to provide input when a candidate label 136 specifies the type.

In some implementations, the server 128 computer can be programmed to compare inputted candidate labels 136 in respective sets of object data to map data to perform verification of one of the inputted candidate labels 136 or the map data. As mentioned above, object data typically includes location data specifying a location at which an image included in the object data was collected. The location in object data can be compared to a location specified on a map to verify an inputted candidate label 136. If a location in object data is within a predetermined threshold of a location specified on a map for an object, and the inputted candidate label 136 identifies a type of object, e.g., a road sign, a traffic light, etc., indicated for the location specified on the map for the object, then the inputted candidate label 136 can be determined to have been verified. Thus, comparison of an inputted candidate label 136 to map data can be used to improve labels used to train a detection module 124, and/or can be an alternative or additional mechanism to the cross-validation described above for adjusting a rating for an object source.

As mentioned above, a detection module 124 can be used to provide output to operate one or more vehicle subsystems 110, including various components such as a braking subsystem 112, a propulsion subsystem 114, a steering subsystem 116, and the vehicle 102 HMI 118. The braking subsystem 112 resists the motion of the vehicle 102 to thereby slow and/or stop the vehicle 102. The braking subsystem 112 may include friction brakes such as disc brakes, drum brakes, band brakes, and so on; regenerative brakes; any other suitable type of brakes; or a combination. The braking subsystem 112 is in communication with and receives input from the computer 104 and/or a human operator. The human operator may control the braking subsystem 112 via, e.g., a brake pedal. The steering subsystem 116 controls the turning of the wheels. The steering subsystem 116 is in communication with and receives input from a steering wheel and/or the computer 104. The steering subsystem 116 may include a rack-and-pinion system with electric power-assisted steering, a steer-by-wire system, e.g., such as are known, or any other suitable system. The propulsion subsystem 114 may include one or more of an internal combustion engine, electric motor, hybrid engine, etc.

Figure 2:
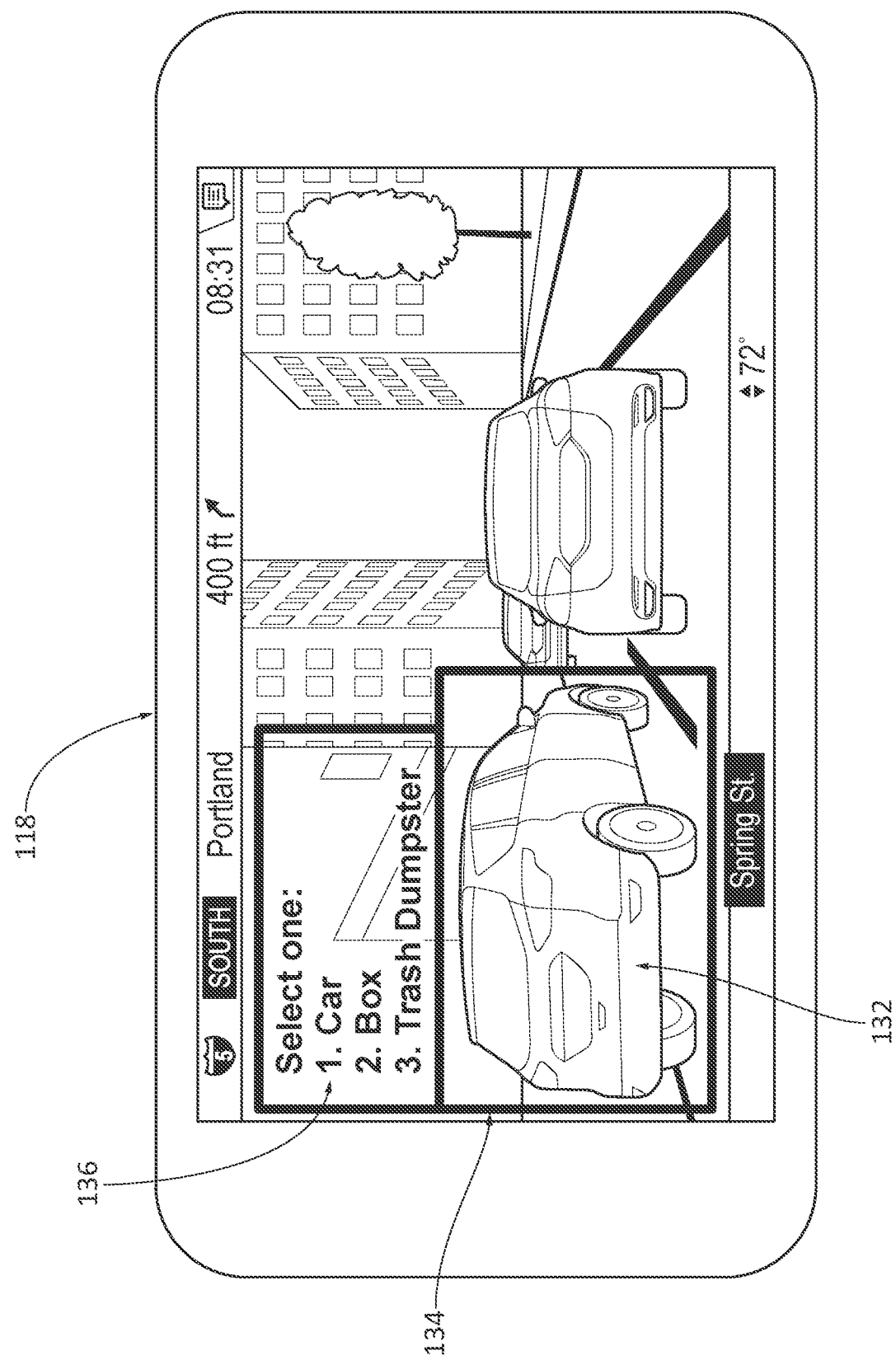
FIG. 2 illustrates an example human machine interface in a vehicle.
Figure 3:
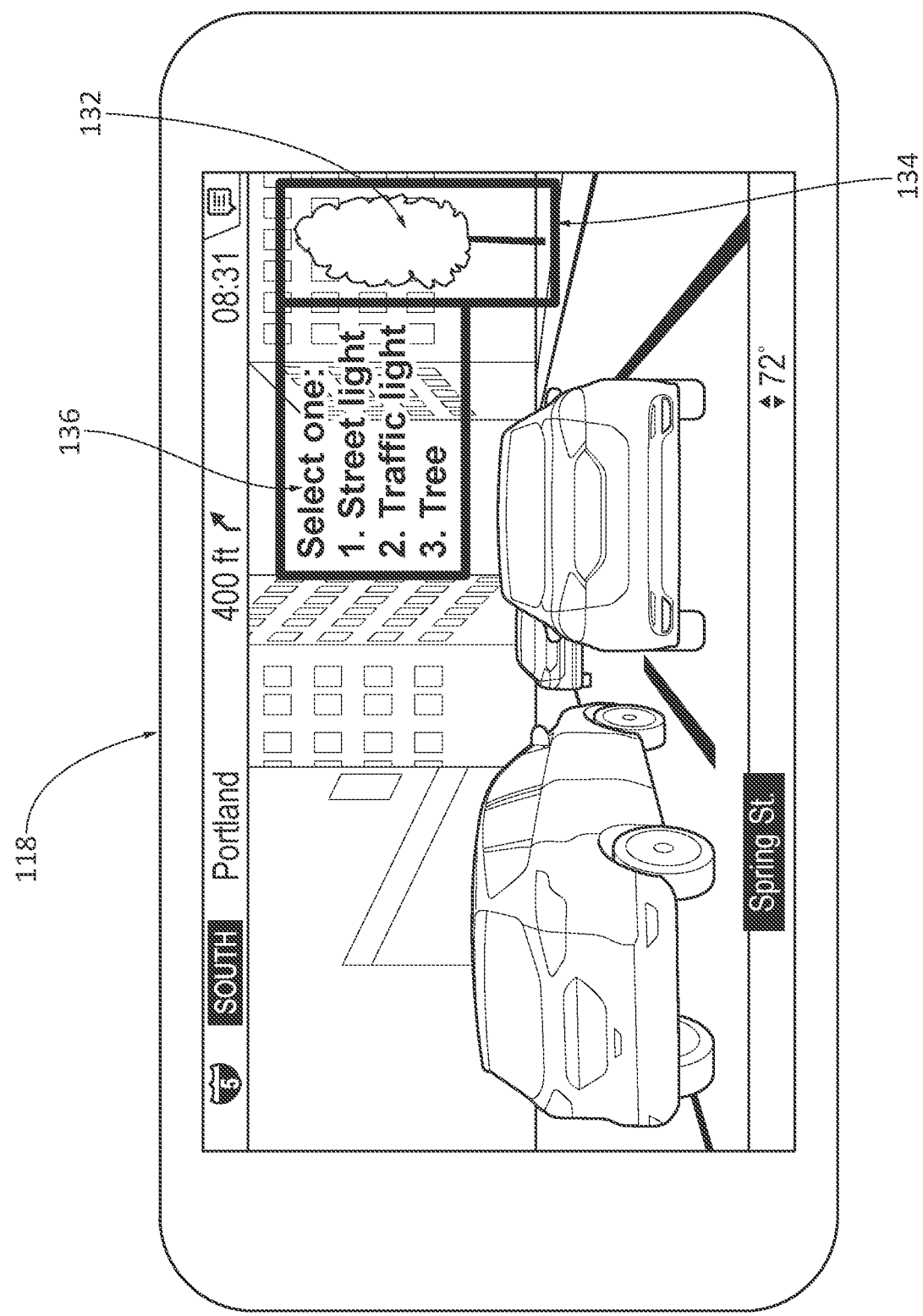
FIG. 3 illustrates another example of a human machine interface in a vehicle.

FIGS. 2 and 3 illustrates respective examples of an HMI 118 in a vehicle 102 including a candidate object 132 surrounded by a bounding box 134, and a set of candidate labels 136 for the candidate object 132. When a collection module 122 in the vehicle 102 is executing, the collection module 122 receives data from vehicle 102 sensors 108 that is input to the machine learning program in the collection module 122, which then outputs the candidate object 132, along with a bounding box 134 for the candidate object 132. In some implementations, the machine learning program in the collection module further outputs one or more candidate labels that can be included in the HMI for a user in the vehicle 102 to select and/or confirm.

Figure 4:
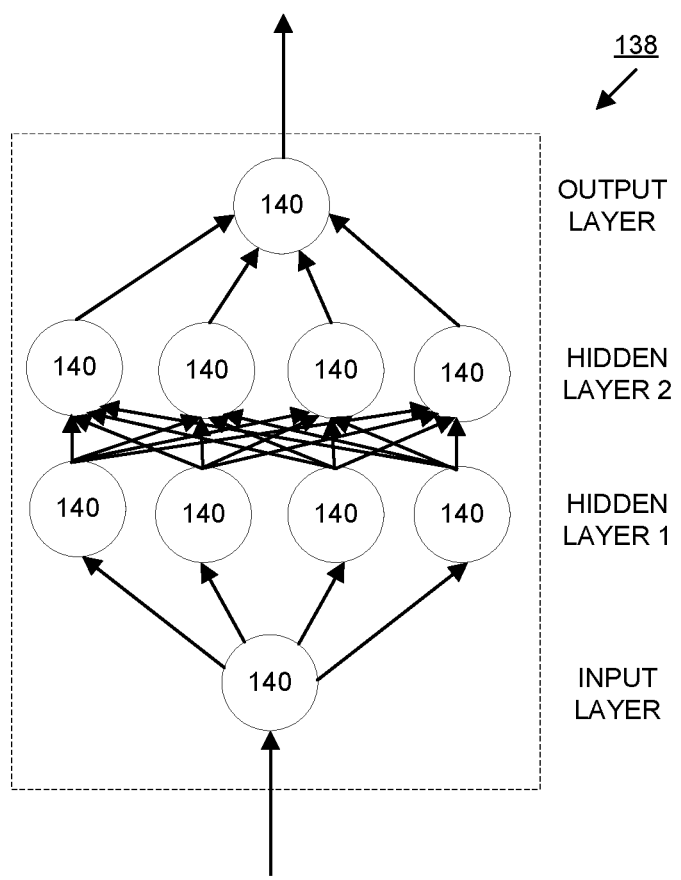
FIG. 4 is a block diagram of an example deep neural network.

FIG. 4 is a block diagram of an example deep neural network or DNN 138. A DNN 138 can be a software program that can be loaded in memory and executed by a processor included in a computer 104, for example. In an example implementation, the DNN 138 can include, but is not limited to, a convolutional DNN 138 (CNN), R-CNN (Region-based CNN), Fast R-CNN, and Faster R-CNN. The DNN 138 includes multiple nodes, and the nodes are arranged so that the DNN 138 includes an input layer, one or more hidden layers, and an output layer. Each layer of the DNN 138 can include a plurality of nodes. While three hidden layers are illustrated, it is understood that the DNN 138 can include additional or fewer hidden layers. The input and output layers may also include more than one node.

The nodes are sometimes referred to as artificial neurons 140, because they are designed to emulate biological, e.g., human, neurons. A set of inputs (represented by the arrows) to each neuron 140 are each multiplied by respective weights. The weighted inputs can then be summed in an input function to provide, possibly adjusted by a bias, a net input. The net input can then be provided to an activation function, which in turn provides a connected neuron 140 an output. The activation function can be a variety of suitable functions, typically selected based on empirical analysis. As illustrated by the arrows in the figure, neuron 140 outputs can then be provided for inclusion in a set of inputs to one or more neurons 140 in a next layer.

As one example, the DNN 138 can be trained with ground truth data, i.e., data about a real-world condition or state. For example, the DNN 138 can be trained with ground truth data and/or updated with additional data. Weights can be initialized by using a Gaussian distribution, for example, and a bias for each node can be set to zero. Training the DNN 138 can include updating weights and biases via suitable techniques such as back-propagation with optimizations. Ground truth data means data deemed to represent a real-world environment, e.g., conditions and/or objects in the environment. Thus, ground truth data can include sensor data depicting an environment, e.g., an object in an environment, along with a label or labels describing the environment, e.g., a label describing the object. Ground truth data can further include or be specified by metadata such as a location or locations at which the ground truth data was obtained, a time of obtaining the ground truth data, etc.

In the present context, a first machine learning program included in a collection module 122 can be a DNN 138 trained with ground truth data label to specify real-world objects, e.g., cars, trucks, trees, roadsigns, traffic lights, etc. The DNN 138 can be trained to output a candidate object 132 and a bounding box 134 for a candidate object 132, along with one or more candidate labels 136. For example, the DNN 138 can be trained to identify likely objects in images of a vehicle 102 environment based on pixels representing objects and pixels representing a remainder of a vehicle 102 environment, e.g., using edge detection techniques or the like. Further, the DNN 138 can be trained to provide a preliminary classification or classifications of an object, i.e., that can be provided as one or more candidate labels 136.

The second machine learning program included in a detection module 124 can then be trained using object data gathered by a collection module 122 including the first machine learning program. For example, after a candidate label 136 is input by a user in response to display of an image including an object in a vehicle 102 HMI 118, the vehicle 102 computer 104 can then send object data including a portion of the image defined by a bounding box 134, sometimes referred to as a "clipped" image, along with the selected candidate label 136. The clipped image can then be an image provided to train the second machine learning program. Further, as noted above, the object data can include other data such as a location of the vehicle 102 at the time the image was captured, environment data, etc.

Figure 5:
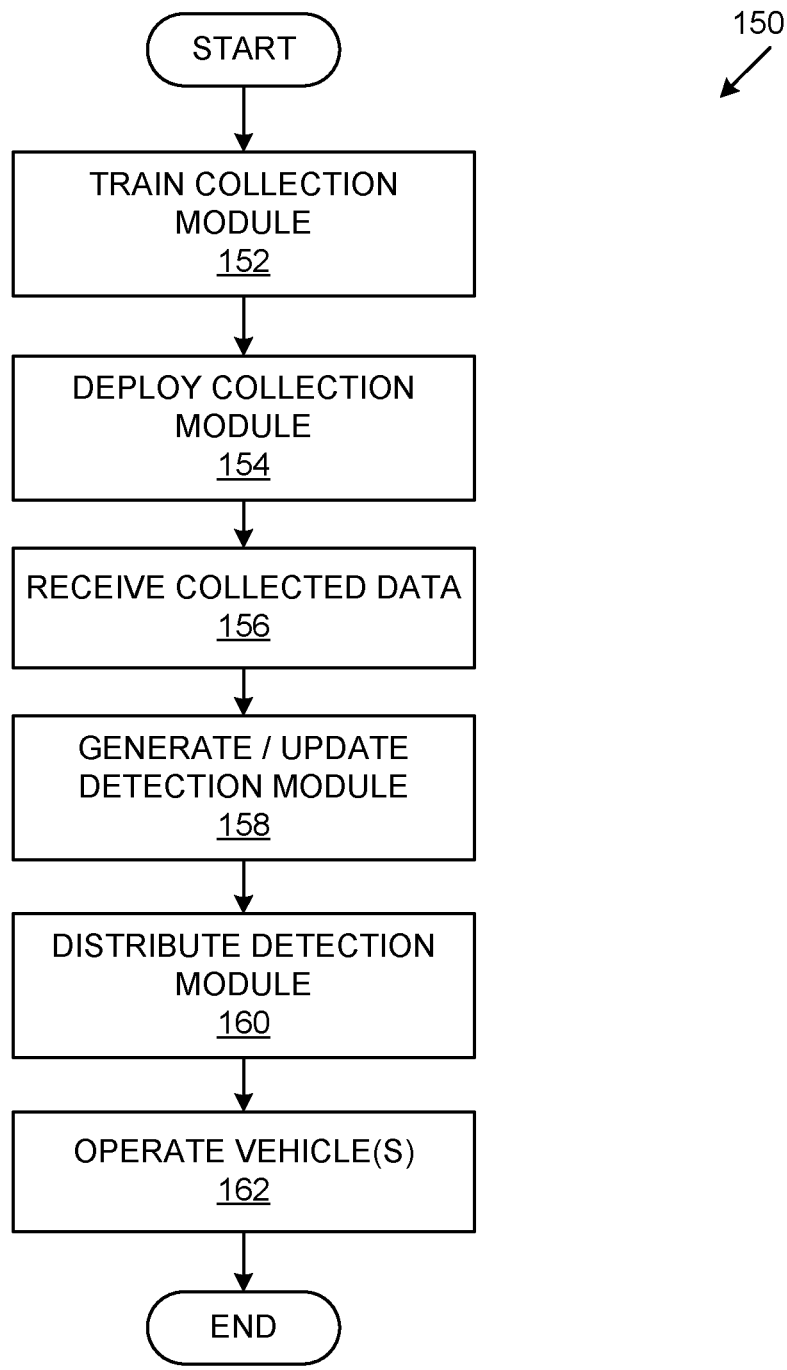
FIG. 5 is a process flow diagram of an example process for training and deploying an object detection module.

FIG. 5 is a process flow diagram of an example process 150 for training and deploying an object detection module 124.

The process 150 can begin in a block 152, in which a first machine learning program, e.g., a DNN 138, is trained to identify the candidate objects 132 and associated bounding boxes 134, as described above.

Next, in a block 154, the collection module 122 is deployed in one or more vehicles 102, typically in tens, hundreds, or thousands of vehicles 102.

Next, in a block 156, collected object data from the collection module 122(s) deployed as described above is provided to and received in the remote server 128, e.g., stored in an object database 130 which can be a relational database, a file system, etc. Various vehicles 102 may provide collected data at various times, e.g., when the wide area network 126 is accessible, when the vehicle 102 is near or in a service center, at a scheduled time, etc.

Next, in a block 158, a detection module 124 can be generated and/or updated at the server 128. That is, as described above, the detection module 124 can include a second DNN 138 trained to detect, i.e., identify and/or classify, objects. The detection module 124 DNN 138 can be trained with the object data collected as described above.

Next, in a block 160, the detection module 124 can be provided to one or more vehicles 102. It should be noted that, although a vehicle 102 is illustrated in FIG. 1 as including both a collection module 122 and a detection module 124, it is possible and even likely that various vehicles 102 will include one of the collection module 122 and the detection module 124, but not both.

In a block 162, one or more vehicles 102 can be operated at least in part with a vehicle 102 computer 104 using input from the detection module 124 to assist vehicle 102 operation. For example, the detection module 124 can provide an identification of an object, whereupon the vehicle 102 computer 104 can actuate a vehicle subsystem 110 based on the object identification or classification. For example, the computer 104 can cause a vehicle 102 to change speed or direction, i.e., actuate one or more of a braking subsystem 112, a propulsion subsystem 114 already steering subsystem 116 in response to an object identification provided by the detection module 124.

Following the block 162, the process 150 ends.

Figure 6:
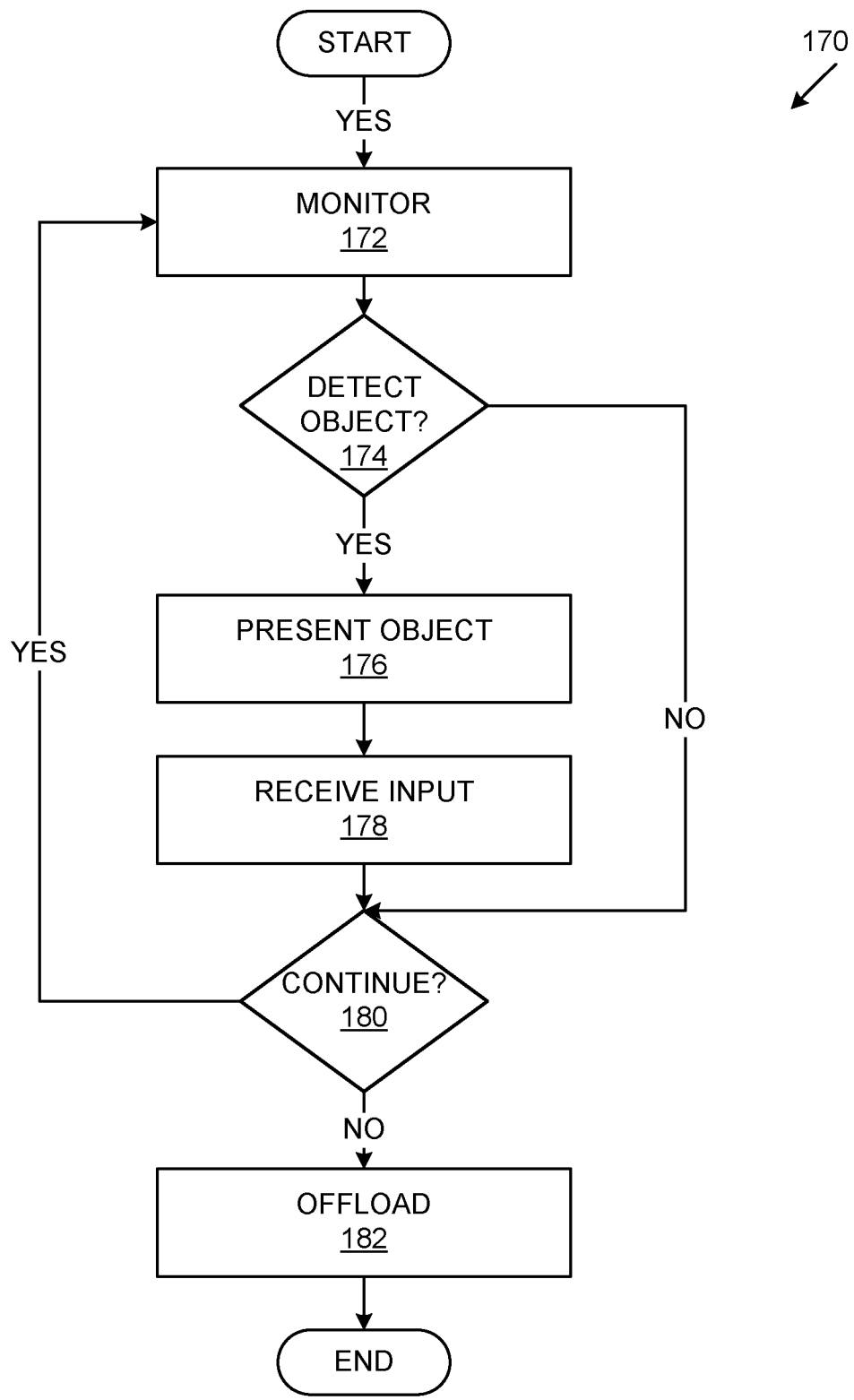
FIG. 6 is a process flow diagram including details of collecting data for training, and training, the object detection module.

FIG. 6 is a process flow diagram including details of an example process 170 for executing a collection module 122 for training, and training, the object detection module 124.

The process 170 begins in a block 172, in which a collection module 122 in a vehicle 102 monitors a vehicle 102 environment for candidate objects 132. As mentioned above, the collection module 122 can include a first machine learning program to detect candidate objects 132. The collection module 122 can further include programming to begin monitoring, e.g., when a vehicle 102 ignition is in an "on" state, when a vehicle 102 is moving, when the collection module 122 is activated according to user input, when the collection module 122 is activated based on a vehicle 102 GPS sensor specifying that the vehicle 102 is in a location in an area that the collection module 122 is programmed to monitor, etc. The collection module 122 can further include programming to display an image of a candidate object 132 and a bounding box 134, and possibly also candidate labels 136 for a candidate image, when the machine learning program in the collection module 122 outputs the candidate object 132 and bounding box 134.

Next, in a block 174, a vehicle 102 computer 104 can determine whether the collection module 122 has output a candidate object 132. If so, a block 176 is executed next. Otherwise, the process 170 proceeds to a block 180.

In the block 176, the computer 104 can cause the candidate object 132 and associated bounding box 134 to be displayed in a display of a vehicle 102 HMI 118, e.g., as shown in FIGS. 2 and 3.

Next, in a block 178, the computer 104 110 can receive input, e.g., via the vehicle 102 HMI 118, providing a candidate labels 136. For example, a user may select a candidate labels 136 from a list provided as shown in FIGS. 2 and 3. Alternatively or additionally, the computer 104 110 could be programmed to accept a candidate labels 136 specified by a user without a list of one or more suggestive labels. That is, the lists of candidate labels 136 in FIGS. 2 and 3 could be omitted, or even if they were not limited, a user could provide input, e.g., voice input, specifying a label, e.g., "car," "tree," "bicycle," etc., without regard to a list of candidate labels 136.

Following either the blocks 174 or 178, in a block 180, it is determined whether the process 170 is to continue. For example, user input could be provided to stop the process, a vehicle 102 could be transitioned to an "off" state, etc. If the process 170 is to continue, the block 172 is executed next. Otherwise, the process 170 proceeds to a block 182.

In the block 182, object data collected and stored in the block 178 is offloaded to a server 128, e.g., or storage in an object database 130 for use in training a detection module 124. As mentioned above, the object data typically includes images defined by bounding boxes 134 including candidate objects 132, along with input candidate labels 136 for the objects, and possibly along with other data, such as environment data. Object data can be offloaded from a vehicle 102 computer 104 via various mechanisms, e.g., via a scheduled transfer via the wide area network 126, by accessing a data port on the vehicle 102, etc.

Following the block 182, the process 170 ends.

Use of "in response to," "based on," and "upon determining" herein indicates a causal relationship, not merely a temporal relationship.

The term "exemplary" is used herein in the sense of signifying an example, e.g., a reference to an "exemplary widget" should be read as simply referring to an example of a widget.

Executable instructions for a computer may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, any other physical medium with patterns of holes, a RAM, a PROM, an EPROM, a FLASH EEPROM, any other memory chip or cartridge, or any other medium from which a computer can read In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

The invention claimed is:

1. A system, comprising:
   an image sensor with a field of view of an exterior of a vehicle;
   a human machine interface (HMI) in the vehicle arranged to display images based on data from the image sensor;
   a first computer in a first vehicle that includes a first processor and a first memory and is programmed to:
      provide data from the image sensor to a machine learning program that outputs a bounding box around an object;
      cause the bounding box around the object to be displayed via the HMI; and
      transmit object data including an inputted label identifying the object to a second computer that is remote from the vehicle; wherein the object data further includes one or more measurements of phenomena around the vehicle other than the object and associated with a time at which the inputted label was input; and
   a second computer that includes a second processor and a second memory and is programmed to:
      receive a plurality of sets of object data from respective vehicles in a plurality of vehicles, including the object data from the first vehicle, whereby the inputted label is one of a plurality of inputted labels in the respective sets of object data;
      perform a cross-validation to verify or reject labels in one or more of the sets of object data;
      provide an updated data collection program by adjusting a rule for requesting user input based on a result of the cross-validation; and
      provide the updated data collection program to the first vehicle.

2. The system of claim 1, wherein the machine learning program further outputs one or more candidate labels for the object, and the first computer is programmed to receive input specifying a user selection of one of the one or more candidate labels.

3. The system of claim 1, wherein
   the object is a first object in a plurality of objects and the bounding box is a first bounding box in a plurality of bounding boxes;
   the machine learning program further outputs the plurality of bounding boxes, including the first bounding box and at least one second bounding box; and
   further wherein each of the bounding boxes is provided around a respective object in the plurality of objects that includes the first object and at least one second object.

4. The system of claim 1, wherein the data from the image sensor includes a plurality of frames of video including the object and captured over a time interval while the vehicle is moving.

5. The system of claim 4, wherein the inputted label is a first inputted label and is associated with a first time in the time interval and the object data includes one or more second inputted labels respectively associated with one or more second times in the time interval.

6. The system of claim 1, wherein the second computer is further programmed to remove rejected labels from the object data.

7. The system of claim 1, wherein
   the second computer is further programmed to classify a user associated with one of the sets of object data based on the result of the cross-validation;
   the rule specifies whether the user is permitted to provide the inputted data; and
   adjusting the rule includes determining that the user is not permitted to provide the inputted data.

8. The system of claim 1, wherein
   the second computer is further programmed to determine a type of one of the objects in the sets of object data;
   the rule specifies a frequency with which a user providing the inputted label for the one of the objects is requested to provide input when a candidate label specifies the type; and
   adjusting the rule includes adjusting the machine learning program to present objects of the type to a user providing the inputted label more or less frequently based on a result of the cross-validation.

9. The system of claim 1, wherein the second computer is further programmed to compare the respective inputted labels to map data to perform verification of one of the inputted labels or the map data.

10. The system of claim 1, wherein the machine learning program is a first machine learning program, and the second computer is further programmed to generate a second machine learning program based on the plurality of sets of object data to perform object identification.

11. The system of claim 10, wherein the second computer is further programmed to provide the second machine learning program to one or more vehicles in the plurality of vehicles or another vehicle.

12. The system of claim 11, wherein the first computer is further programmed to receive the second machine learning program, and operate the vehicle according to object identification output from the second machine learning program.

13. A method, comprising:
    providing data, from a vehicle image sensor with a field-of-view of an exterior of the vehicle, to a machine learning program that outputs a bounding box around an object;
    causing the bounding box around the object to be displayed via a human machine interface (HMI) in a first vehicle arranged to display images based on data from the image sensor;
    transmitting object data including an inputted label identifying the object from a first computer in the first vehicle to a second computer that is remote from the vehicle; wherein the object data further includes one or more measurements of phenomena around the vehicle other than the object and associated with a time at which the inputted label was input;
    receiving, in the second computer, a plurality of sets of object data from respective vehicles in a plurality of vehicles, including the object data from the first vehicle, whereby the inputted label is one of a plurality of inputted labels in the respective sets of object data;
    performing a cross-validation to verify or reject labels in one of more of the sets of object data;
    provide an updated data collection program by adjusting a rule for requesting user input based on a result of the cross-validation; and
    providing the updated data collection program to the first vehicle.

14. The method of claim 13, wherein the machine learning program further outputs one or more candidate labels for the object, and the method further comprises receiving input specifying a user selection of one of the one or more candidate labels.

15. The method of claim 13, wherein
    the object is a first object in a plurality of objects and the bounding box is a first bounding box in a plurality of bounding boxes;
    the machine learning program further outputs the plurality of bounding boxes, including the first bounding box and at least one second bounding box; and
    further wherein each of the bounding boxes is provided around a respective object in the plurality of objects that includes the first object and at least one second object.

16. The method of claim 13, wherein the data from the image sensor includes a plurality of frames of video including the object and captured over a time interval while the vehicle is moving.

17. The method of claim 16, wherein the inputted label is a first inputted label and is associated with a first time in the time interval and the object data includes one or more second inputted labels respectively associated with one or more second times in the time interval.

* * * * *